United States Patent
Mitsch

(10) Patent No.: US 10,718,232 B2
(45) Date of Patent: Jul. 21, 2020

(54) VIBRATION ABSORBER HAVING AN ELECTROMAGNETIC BRAKE FOR WIND TURBINES

(71) Applicant: FM ENERGIE GMBH & CO. KG, Heppenheim (DE)

(72) Inventor: Franz Mitsch, Heppenheim (DE)

(73) Assignee: FM ENERGIE GMBH & CO. KG, Heppenheim (DE)

(*) Notice: Subject to any disclaimer, the term of this patent is extended or adjusted under 35 U.S.C. 154(b) by 114 days.

(21) Appl. No.: 16/069,025

(22) PCT Filed: Jan. 9, 2017

(86) PCT No.: PCT/EP2017/000016
§ 371 (c)(1),
(2) Date: Jul. 10, 2018

(87) PCT Pub. No.: WO2017/121633
PCT Pub. Date: Jul. 20, 2017

(65) Prior Publication Data
US 2019/0024535 A1 Jan. 24, 2019

(30) Foreign Application Priority Data
Jan. 15, 2016 (EP) .................... 16000097

(51) Int. Cl.
*F16F 7/10* (2006.01)
*F01D 25/04* (2006.01)
(Continued)

(52) U.S. Cl.
CPC .......... *F01D 25/04* (2013.01); *F03D 7/0244* (2013.01); *F03D 80/82* (2016.05); *F16F 7/1011* (2013.01);
(Continued)

(58) Field of Classification Search
CPC ........... F16F 7/10; F16F 7/1022; F01D 25/04; F03D 80/82
(Continued)

(56) References Cited

U.S. PATENT DOCUMENTS 4,407,395 A * 10/1983 Suozzo .................. F16L 3/202
188/134
5,442,883 A * 8/1995 Nishimura .............. E04B 1/985
52/167.2
(Continued)

FOREIGN PATENT DOCUMENTS

EP 1008747 A2 6/2000
EP 2378118 A2 10/2011
(Continued)

OTHER PUBLICATIONS

Written Opinion filed in corresponding PCT Application No. PCT/EP2017/000016 dated Apr. 18, 2017.
(Continued)

*Primary Examiner* — Christopher P Schwartz
(74) *Attorney, Agent, or Firm* — Davis & Bujold PLLC; Michael J. Bujold

(57) ABSTRACT

A vibration absorber which, in the broadest sense, is based on a pendulum device for dampening undesirable vibrations which occur in a very slender structure, such as a wind turbine. The undesirable vibrations are caused by an acting force, in particular wind force. The invention thereby relates to vibration absorbers in which the pendulum mass can be temporarily stopped or braked, either entirely or partially, by an electromagnetic brake. The power supply or the current regulation of the electromagnetic brake correspondingly controls the braking function of the electromagnetic brake.

22 Claims, 7 Drawing Sheets

(51) Int. Cl.
*F03D 80/80* (2016.01)
*F03D 7/02* (2006.01)
*H02K 49/04* (2006.01)

(52) U.S. Cl.
CPC ...... *H02K 49/046* (2013.01); *F05B 2260/903* (2013.01); *F05B 2260/964* (2013.01); *F16F 2222/08* (2013.01); *F16F 2228/066* (2013.01); *F16F 2230/18* (2013.01)

(58) Field of Classification Search
USPC ..... 188/156–164, 378–382; 52/167.1, 167.2; 248/550, 562; 290/44, 55
See application file for complete search history.

(56) References Cited

U.S. PATENT DOCUMENTS

| | | | | |
|---|---|---|---|---|
| 5,713,163 A * | 2/1998 | Mutaguchi | ............ | B61B 12/04 114/121 |
| 5,934,029 A * | 8/1999 | Kawai | ............ | E04H 9/023 52/167.1 |
| 6,164,022 A * | 12/2000 | Ishikawa | ............ | B23Q 1/48 52/167.1 |
| 6,385,917 B1 * | 5/2002 | Konomoto | ............ | E04H 9/021 52/167.1 |
| 7,716,881 B2 * | 5/2010 | Tsai | ............ | E04H 9/023 248/636 |
| 8,484,911 B2 * | 7/2013 | Zayas | ............ | E04H 9/023 248/562 |
| 8,672,107 B2 * | 3/2014 | Ivanco | ............ | F16F 7/116 188/380 |
| 2018/0252287 A1 * | 9/2018 | Mitsch | ............ | F16F 7/1022 |

FOREIGN PATENT DOCUMENTS

| | | |
|---|---|---|
| EP | 2746483 A1 | 6/2014 |
| JP | S58225241 A | 12/1983 |
| JP | S62242153 A | 10/1987 |
| WO | 2017/036581 A1 | 3/2017 |

OTHER PUBLICATIONS

International Search Report filed in corresponding PCT Application No. PCT/EP2017/000016 dated Apr. 18, 2017.

\* cited by examiner

Fig. 4 (a) (b)
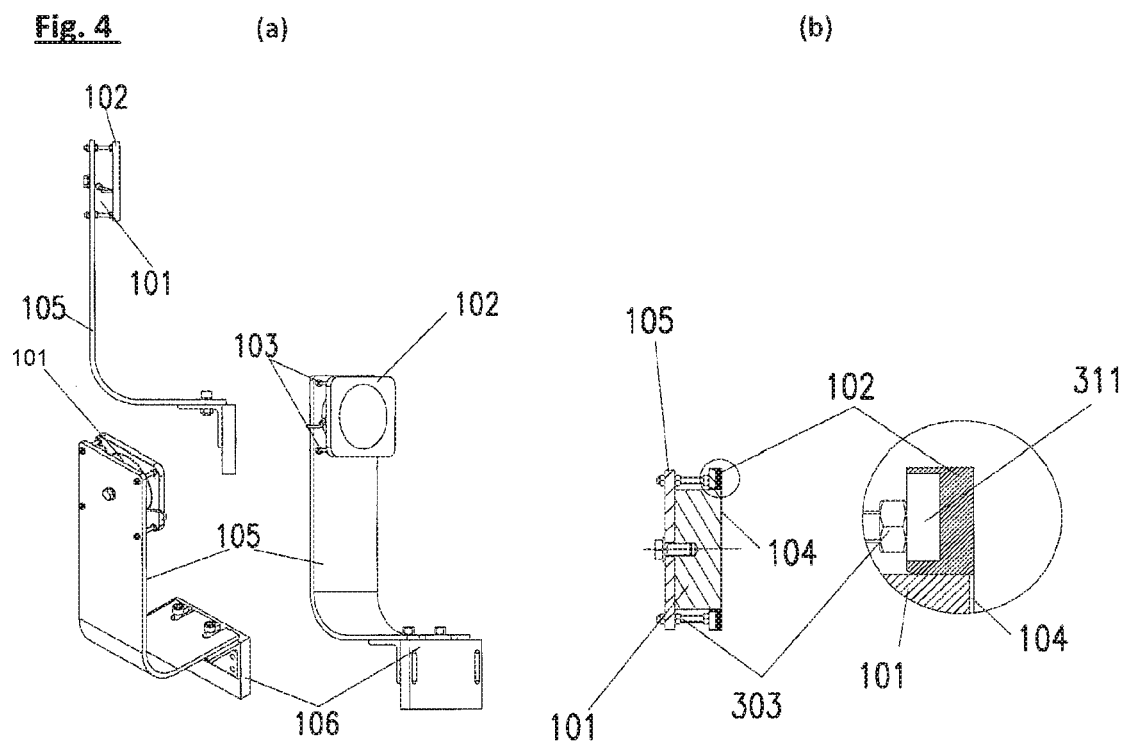
Fig. 5
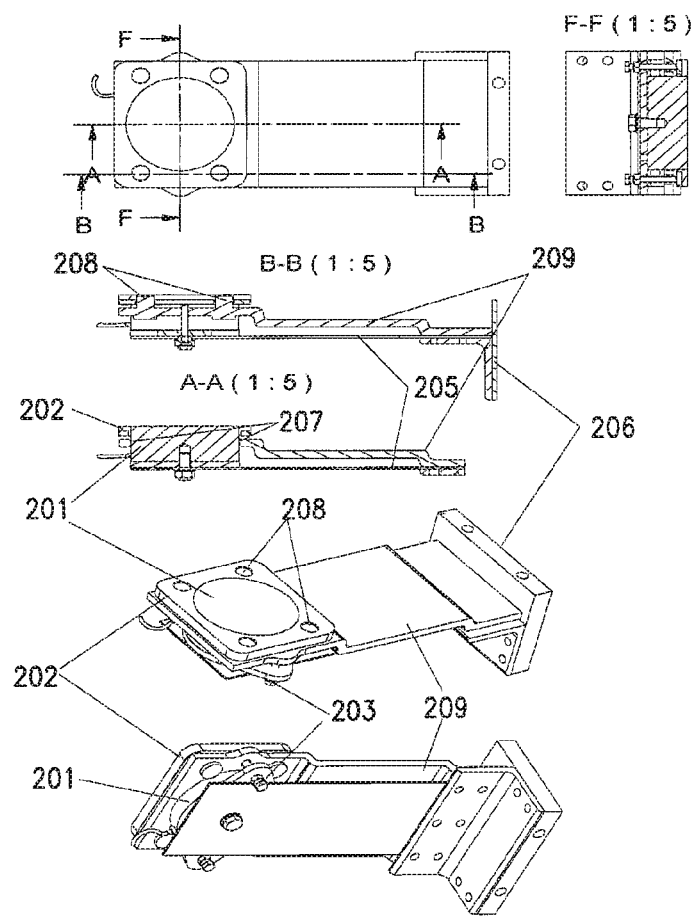

Fig. 13
(a)
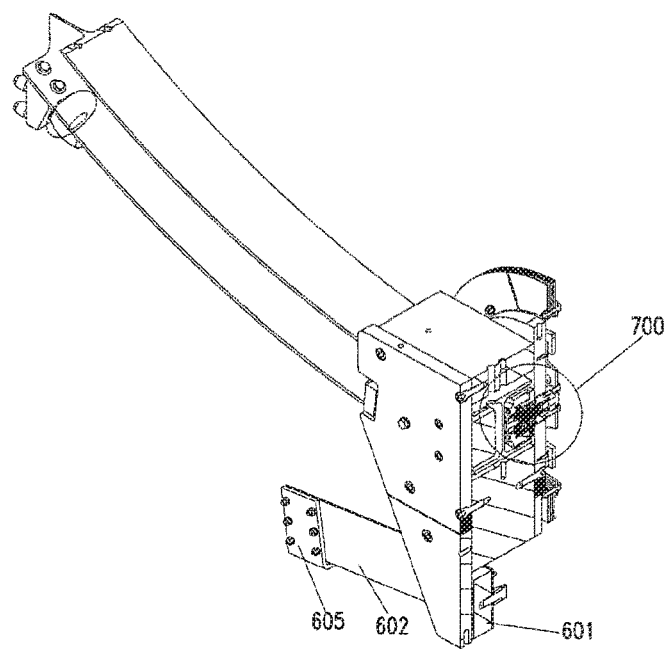
(b)
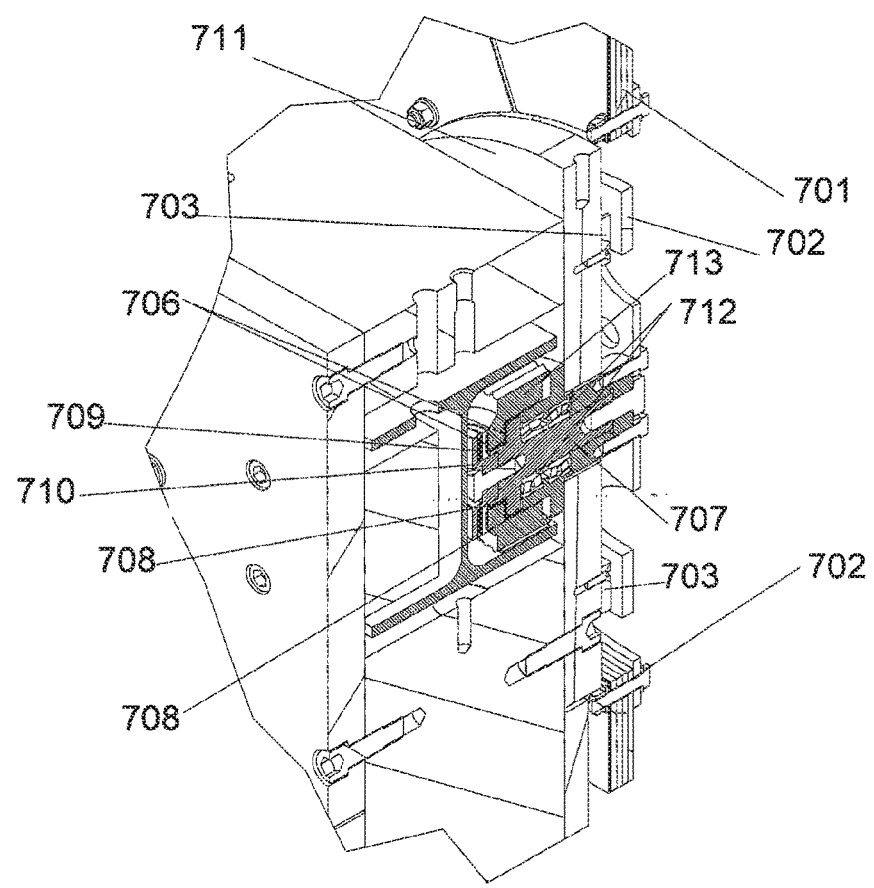

VIBRATION ABSORBER HAVING AN ELECTROMAGNETIC BRAKE FOR WIND TURBINES

This application is a national stage completion of PCT/EP2017/000016 filed Jan. 9, 2017 which claims priority from European Application Serial No. 16 000 097.2 filed Jan. 15, 2016.

FIELD OF THE INVENTION

The invention relates to a vibration absorber which is based in the broadest sense on a pendulum device for damping undesired vibrations which occur due to forces acting, in particular wind forces in tall slim structures, in particular wind turbines. The invention here relates to vibration absorbers in which the pendulum mass can be completely or partially or temporarily stopped or braked by an electromagnetic brake, depending on control of the brake, by corresponding supply of current or current regulation. In a particularly advantageous embodiment, the vibration absorber is a rolling pendulum absorber.

BACKGROUND OF THE INVENTION

There are in principle various use cases of brakes for vibration absorbers. This applies both to vibration absorbers in wind turbines, but also to vibration absorbers in other slim structures, such as towers, masts, high-rise buildings.

In a first use case, the vibration absorber is always free. The absorber, for example of a wind turbine, is always in operation and must be captured and held by the damper for maintenance purposes.

In a second use case, the absorber is fixed during operation of the installation. The absorber, for example of a wind turbine, is switched off during operation of the installation and is intended to be switched on when the installation is put into operation or also in the case of a power outage. In this case, the absorber is used exclusively in order to safeguard the installations against Karmann vortex excitation. To this end, the absorber is operated only when the installation is at standstill. It must be absolutely guaranteed here that the absorber is reliably switched on in the case of standstill of the installation and/or in the case of a power outage.

In the third use case, the freely swinging absorber swings without braking during operation of the installation. In the case of particularly strong impacts, caused, for example, by gusts of wind, the tower of a wind turbine together with the vibration absorber is subjected to strong accelerations. Due to these accelerations, the absorber hits the end stop. In order to reduce or even prevent the impact if the absorber hits the stop, the absorber is "braked" with the aid of a brake.

In another use case, it is desirable to keep the damping of the absorber as low as possible, for example in the case of the rolling pendulum absorbers described here, which have a rotating pendulum mass alongside a main mass and are moved on a curved track. The side peaks arising in the case of these undamped systems are particularly high and can therefore have interfering effects. It therefore makes sense to brake the absorber in the frequency range less or greater (+/−10%) than the inherent frequency of the tower.

The object arising is thus to provide a brake device for pendulum absorbers, in particular rolling pendulum absorbers, for the use cases described and others, which can service the various braking and damping events, where appropriate in a targeted manner and controlled by corresponding current management.

The object has been achieved by the vibration absorbers described below and in the claims.

SUMMARY OF THE INVENTION

Invention thus relates primarily to a vibration absorber for damping vibrations in wind turbines, which has leased one pendulum device, comprising an absorber mass (1) which (i) is attached to a suspension construction (2) in such a way that it can swing freely, or alternatively (ii) is connected to a running device (507), which is curved in an essentially concave or circular manner at least in its central region and on which the absorber mass can be moved to and fro together with a driven rotating, rotationally symmetrical rotation mass component (510) by means of roller- or wheel-driven running gear (508), where the vibration damper has, in accordance with the invention, an electromagnetic brake device, which comprises an electromagnet (101, 201, 301, 401, 501, 601), which is attached to a springy retention or guide device (105, 106, 205, 206, 209, 306, 307, 308, 309, 505, 506, 602) on the vibration absorber in such a way that, when current flows in the electromagnet, the electromagnet is pulled onto the absorber mass (1) or onto the rotation mass component (510), which is connected to the absorber mass (1), until contact occurs, so that the movement of the absorber mass or rotation mass component is thereby braked or stopped, and the electromagnet returns to its initial position in the current-free state due to the springy holder or merely due to its weight, with release of the absorber mass or rotation mass component. In a preferred embodiment of the invention, the electromagnetic brake is in this case operated by controlled current management in such a way that it effects the stopping or braking and re-starting of the absorber mass (1, 510), or variable frequency-dependent damping of the movement of the absorber masses and thus of the undesired vibrations.

In the first case (i), the vibration absorber according to the invention is a classical pendulum absorber, in which the absorber mass is able to swing freely in the x/y plane on cables or rods.

In the second case (ii), the vibration absorber according to the invention is a rolling absorber, which runs to and fro in the x or y direction like a pendulum on a curved running surface, for example a real construction.

In accordance with the invention, the electromagnetic brake device essentially comprises an electromagnet in a preferably flat disc-shaped embodiment, which is mounted on a springy retention and guide device 105, 106, 205, 206, 209, 306, 307, 308, 309, 505, 506, 602), and a mechanical and/or electronic device for regulating the operation of the electromagnet depending on the movement of the absorber mass, in such a way that, with the aid of the regulation, the absorber can be completely stopped (in case of maximum current flow), braked or re-started (in the case of no current or low current strengths) or can also be used for variably adjustable damping of the absorber.

The electromagnetic brake device according to the invention is connected to the machine part of the device to be damped and is arranged in such a way that, when the current is switched on, the electromagnet is able to come into contact with the swinging absorber mass or with a surface (3) which is connected to the absorber mass, and to detach itself from this again when the current is interrupted. This is effected by the spring forces of the springy element (leaf spring). In accordance with the invention, the contact surface here can be a plate or a broadening of the absorber mass on one of its sides, but also a flange (606) connected directly or indirectly to the absorber mass. For space reasons, it is advantageous to place the brake device above or below, preferably below, the absorber mass, or the rotation mass component (510) in case of a rolling pendulum absorber.

In an embodiment of the invention, the said retention and guide device for the electromagnet comprises a spring device, which is a leaf spring (105, 205, 505), to one end of which is attached the electromagnet (101, 201, 301, 401, 501), which is pulled against the absorber mass (1) or flywheel mass (510) under tension of the leaf spring when current is flowing and is returned to the initial position by the stored spring force in the case of no current.

In another embodiment of the invention, the retention and guide device for the electromagnet is designed and arranged in such a way that, in current-free operation, the electromagnet detaches from the absorber mass solely due to its weight and is able to return to the starting position.

In a preferred embodiment of the invention, the electromagnet does not, when current is flowing, come into direct contact with the mass (1, 510) to be braked or damped, since metal would otherwise be moved on metal here. For this reason, the electromagnet has, in accordance with the invention, a brake lining in the form of a brake plate, a brake layer or a brake ring structure (102, 202, 302), where this lining completely or partly covers the area of the electromagnet facing the mass (1, 510) to be braked/damped. In order to even out or compensate for any brake lining wear that occurs, the vibration absorber can furthermore have a device (103, 203, 303) for adjusting the thickness and readjusting the separation of the said brake lining from the mass (1, 510).

In a particular embodiment, the brake lining (102, 202, 302) is a brake ring which covers the edge regions of the electromagnet and can be moved in the direction of the mass to be braked or the contact area of the electromagnet by adjustment devices (103, 203, 303).

The brake lining can be made of usual materials for brake linings or from a friction-resistant elastomer or plastic material. In a preferred embodiment of the invention, the brake lining consists of polyurethane elastomer, preferably polyester-urethane rubber, but may also consist of usual materials for brake linings.

Variable frequency-adapted damping or braking effect by the various described embodiments of the absorber according to the invention preferably takes place by the brake being electrically/electronically activated. In this case, the brake impulse is triggered, for example, with the aid of a vibration measurement system, which reacts to high accelerations and can be set to a variable triggering set value (0.8 m/s$^2$ to 2 m/s$^2$, the value is dependent on the inherent frequency of the tower; in the case of an inherent frequency of 0.25 Hz and 0.5 m tower amplitude, and acceleration of 1.23 m/s$^2$ arises). The triggering of the brake causes friction between brake lining and absorber mass, so that relatively small forces can be transmitted over a longer period than is usual in the case of an end stop.

In principle, the braking is achieved by means of the vibration absorber according to the invention with an electrical coil magnet, to which an electrical voltage is applied during operation of the installation, so that the iron core is in operation as magnet. As soon as no voltage is present at the iron core, it loses its magnetic effect, the brake switches off and the vibration absorber or its pendulum mass is released.

Owing to noise and corrosion protection, it is advantageous to avoid direct metallic contact between electromagnet and absorber (mass). For this reason, a brake lining (brake plate, 102) arranged on or wrapped around the magnet is proposed in accordance with the invention. This brake lining may also be arranged in the centre of a ring-shaped magnet. In order that the magnet does not come into any contact with metal, the brake plate (102) is arranged projecting by about 0.5 mm to 1 mm. In order to be able to compensate for wear, the position of the brake plate can be adjusted using an adjustment device (103), for example screws.

Alternatively or also in addition, it is possible to coat the entire electromagnet with a brake lining in a thickness of 0.5 mm to 1 mm. The friction-afflicted surface of the brake lining (102) can consist, for example, of a plastic or also of an organic material having a high coefficient of friction. Examples thereof are polyurethanes, in particular polyester-urethane elastomers, such as, in particular, Vulkollan®, which has very low wear for these purposes, so that it is sufficient if the brake lining only projects 0.5-1 mm.

In a particular and advantageous embodiment of the invention, the vibration absorber is a rolling pendulum absorber, in which the absorber mass (1, 510) is located on running gear which can move to and fro in a plane on a curved running rail, like the movement of a classical pendulum.

The invention thus relates to a vibration absorber in which the pendulum device is connected to a running device (507), which is essentially curved in a concave or circular manner, at least in its central region, and on which the absorber mass (1) can be moved to and fro together with the rotating rotation mass component (510) by means of roller- or wheel-driven running gear (508), where the rotation mass component has an axis of rotation perpendicular to the plane of the orbit of the running device, and the rotation device of the rotation mass component essentially corresponds to the respective direction of the moved running gear (508) along the running device (507). A typical rolling pendulum absorber of this type in accordance with the invention is described in greater detail below.

The rotation mass component (510) should in accordance with the invention have an adjustable variable rotating mass (512, 701), which corresponds to 1%-30% of the absorber mass (1), depending on the diameter. The rotation mass component (510) essentially comprises a driven flywheel (611, 711) with drive axle or shaft and optionally a roller bearing and one or more mass discs (512, 701) or disc segments thereof, which can be pushed onto the axle or shaft of the flywheel or attached thereto and rotate together with the flywheel. The rotation mass component (510) has an adjustable variable rotating mass (512, 701), which preferably corresponds to 1%-30% of the absorber mass (1), depending on the diameter. In a further embodiment, the flywheel (611, 711) has a device which enables the diameter of the mass discs or mass disc segments of the rotation mass component to be changed, or the centre of gravity of the rotating discs or disc segments to be changed radially outwards or inwards. Furthermore, it is also possible to employ mass discs of different diameter. This facilitates variable frequency adaptation of the absorber and damping by the absorber.

In a further variant of the rolling pendulum absorber described, this has an additional eddy current damper, which is accommodated and effective in the rotation mass component (510) and primarily influences the flywheel mass. The eddy current damper here comprises a magnet arrangement (703) consisting of permanent magnets and an electrically conductive, non-magnetisable metal disc (702) (conductor disc). The magnet arrangement (703) can be arranged here on the periphery of the flywheel (711, 611), where the metallic conductor disc (702) is permanently installed between magnet arrangement and flywheel mass (512, 701). Alternatively, the flywheel (711, 611) is provided with the co-rotating metallic conductor disc (702) or is itself the conductor disc, and the magnet arrangement (703) opposite is arranged on a non-co-rotating plate, which is located between flywheel (711, 611) and flywheel mass (512, 701).

The running device (507) has one, preferably two, parallel running rails (for example two T rails) on which the running gear (508) with the absorber main mass (1) and the rotating flywheel mass (510) can be moved to and fro on the running device on at least two running wheels or running rollers. In a preferred embodiment, at least one running rail and/or at least one running wheel of the running device (507) is provided with a coating, impression or surface structure for the running surfaces which increases the friction forces. For improved adhesion and increased friction, at least some of the drive or running wheels have a friction-increasing running surface structure. In a particular embodiment, the impression comprises a toothed belt or tooth structure. For further improvement, a slip clutch (700) may also be integrated into the drive system of the rotation mass component (510).

The rolling pendulum absorber described which is fitted with a brake device according to the invention is eminently suitable for damping vibrations below 5 Hz, in particular <1 Hz, in particular <2.5 Hz, preferably between 0.1 and 0.25. For the corresponding frequency changes, only small masses of about 1/20 to 1/4, preferably about 1/10, of the swinging main mass are necessary here, which is a significant advantage over comparable swinging absorbers of the prior art. Thus, the frequency of a swinging main mass of 250 kg can be changed by 20-30% using a rotation mass of around 65 kg with a diameter of 0.25 m in the case of a length of the running device of 2.5 m-3.5 m. The same effect only requires a rotation mass of around 15 kg in the case of a diameter of the rotation mass of 0.5 m and a rotation mass of about 7 kg in the case of a diameter of 0.75 m. Furthermore, the frequency of a swinging main mass of 500 kg can be changed by 20-30% using a rotation mass of around 130 kg with a diameter of 0.25 m in the case of a length of the running device of 2.5 m-3.5 m. The same effect only requires a rotation mass of around 30 kg in the case of a diameter of the rotation mass of 0.5 m and a rotation mass of about 15 kg in the case of a diameter of 0.75 m. Furthermore, the frequency of a swinging main mass of 1000 kg can be changed by 20-30% using a rotation mass of around 250 kg with a diameter of 0.25 m in the case of a length of the running device of 2.5 m-3.5 m. The same effect only requires a rotation mass of around 65 kg in the case of a diameter of the rotation mass of 0.5 m and a rotation mass of about 30 kg in the case of a diameter of 0.75 m.

The use of an absorber of this type makes it possible in accordance with the invention to carry out a frequency change of the inherent vibration by up to 30%, preferably up to 20%, in particular up to 10 or 15%, depending on the rotation mass or moment of inertia selected and on other design properties of this rotating mass, which corresponds to about 1% to 30% of the main mass.

In general, the frequency can be changed, inter alia, by the following measures on the flywheel alone: (i) size of the mass, (ii) position of the mass or centre of gravity of the mass on the axle: the moment of inertia of the mass thus changes when the mass is pushed axially outwards or inwards along the axle, (iii) position of the mass or centre of gravity of the mass in relation to the diameter of the rotating component and (iv) length and curvature of the running device. Thus, in a particular embodiment of the invention, the centre of gravity of the mass is displaced radially inwards or outwards by means of a displacement device, which likewise leads to a change in the moment of inertia of the mass, in turn enabling the resonant frequency to be influenced. In a simpler variant, mass discs which are simply of larger or smaller diameter (with the same total rotation mass) can be mounted on the flywheel.

The absorbers according to the invention, in particular the particularly advantageous rolling pendulum absorbers, exhibit excellent damping properties in towers and nacelles of wind turbines, but also in the case of other tall and slim structures that are subjected to vibrations, in a variably adjustable frequency range which is matched to the inherent frequencies of the vibration system to be damped, in the case of wind turbines in a range preferably between 1 and 20 Hz. As already mentioned, the brake device also makes it possible to carry out fine tuning of the frequency of the absorber, also making it possible to select values which are slightly above or below the inherent frequency of the installation in order thus to counter certain vibration problems.

The vibration absorbers according to the invention with the electromagnetic brakes described may be present in a very wide variety of embodiments and arrangements on and in the absorber. Examples are shown in FIG. 1-13, which are described in greater detail below.

The reference numerals used have the following meanings:

Vibration Absorber:
1 Absorber Mass
2 Suspension construction
3 Plate or flange as contact surface for electromagnetic brake
506 Attachment construction
507 Running rail/running device
508 Drive rollers/running device
509 Parking brake for flywheel mass
510 Rotation mass component comprising a flywheel and a flywheel mass
511 Flywheel
512 Flywheel mass
606 Plate/flange as contact surface for electromagnetic brake
610 Stop buffer running rail
700 Slip clutch comprising clutch disc 706 and compression spring part (709, 710)
701 Flywheel mass/rotation mass
702 Eddy current conductor plate
703 Eddy current magnet element/plate with magnet elements
706 Clutch disc/lining disc
707 Drive shaft
708 Sliding bearing
709 Compression spring
710 Compression spring pretensioning disc
711 Flywheel (with or without spokes)
713 Drive roller with teeth
712 Roller bearing-drive roller
Electromagnetic Brake:
4 Magnetic brake open (with air gap)
5 Magnetic brake closed
100 Brake device (complete)
101 Electromagnet
102 Brake plate
103 Adjustment screws for brake plate 104 Projection of the brake plate beyond magnets
105 Leaf spring
160 Attachment construction
200 Brake device (complete)
201 Electromagnet
202 Brake plate
203 Adjustment screws for brake plate
205 Leaf spring
205a Advanced leaf spring
206 Attachment construction
207 Magnet guide on outside diameter
208 Magnet guide by cams which project into the brake lining
209 Magnet holder
301 Electromagnet
302 Brake plate brake lining
303 Adjustment screws for brake plate/brake lining
304 Projection of the brake plate beyond magnets
306 Attachment construction
307 Magnet guide on outside diameter
308 Magnet guide by cams which project into the brake lining
309 Magnet holder
310 Magnet support
311 Brake lining support plate
412 Magnet guide by cams which project into the brake lining
413 Lower retention plate
501 Electromagnet
502 Brake plate
503 Adjustment screws for brake plate
504 Projection of the brake plate beyond magnets
505 Leaf spring
514 Magnet gap unbraked
515 Magnet gap braked
601 Electromagnet
602 Leaf spring
603 Stiffening element
604 Insulation element
605 Attachment for brake device to the absorber construction

BRIEF DESCRIPTION OF THE DRAWINGS

The invention will now be describe with reference to the accompanying drawings in which:

FIGS. 4A, 4B, 5, 6 and 7 show various embodiments, designs and arrangements of the brake device, according to the invention, using, for example, reinforcing stays and brake linings;

FIGS. 11, 12, 13A and 13B show further advantageous embodiments of a rolling pendulum absorber, according to the invention, having a brake device according to the invention, as described, very space-saving below the running gear and below the running rails.

MORE DETAILED DESCRIPTION OF THE INVENTION WITH REFERENCE TO THE FIGURES

Figure 1:
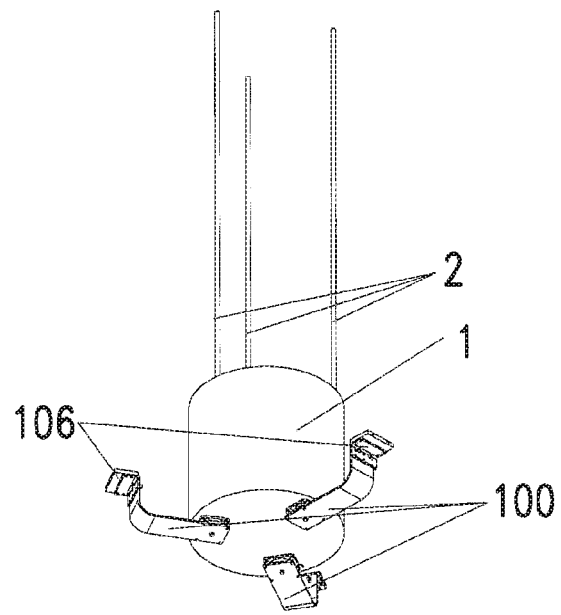
FIGS. 1 to 3 show a vibration absorber for a tower, in particular of a wind turbine, which is fitted, for example, with three electromagnetic brake devices.
Figure 2:
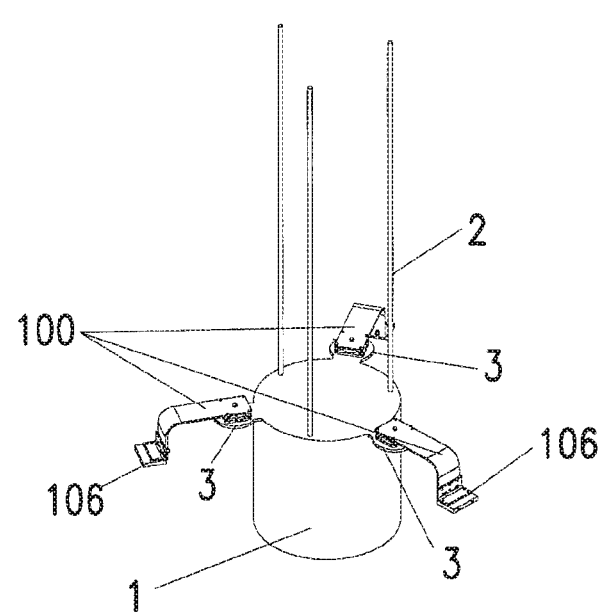
Figure 3:
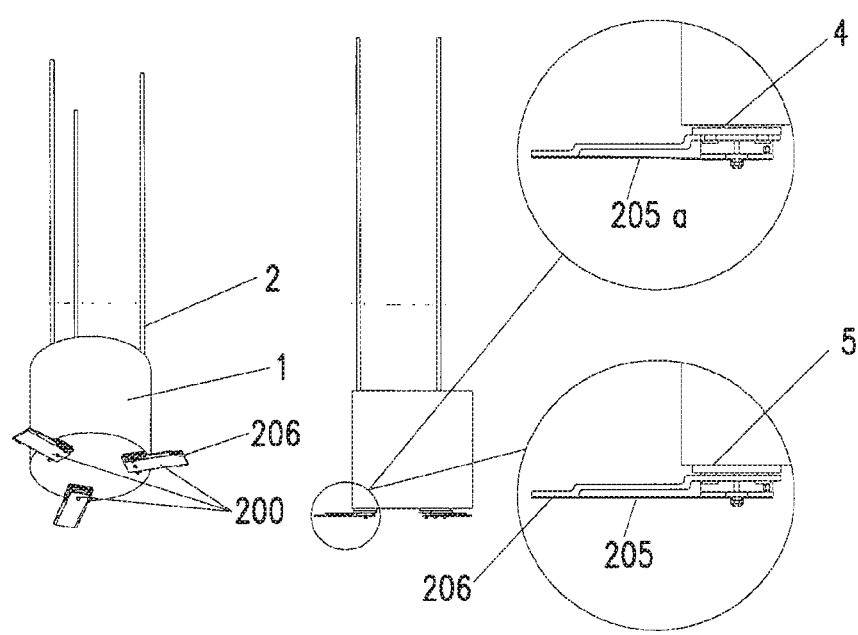
Figure 6:
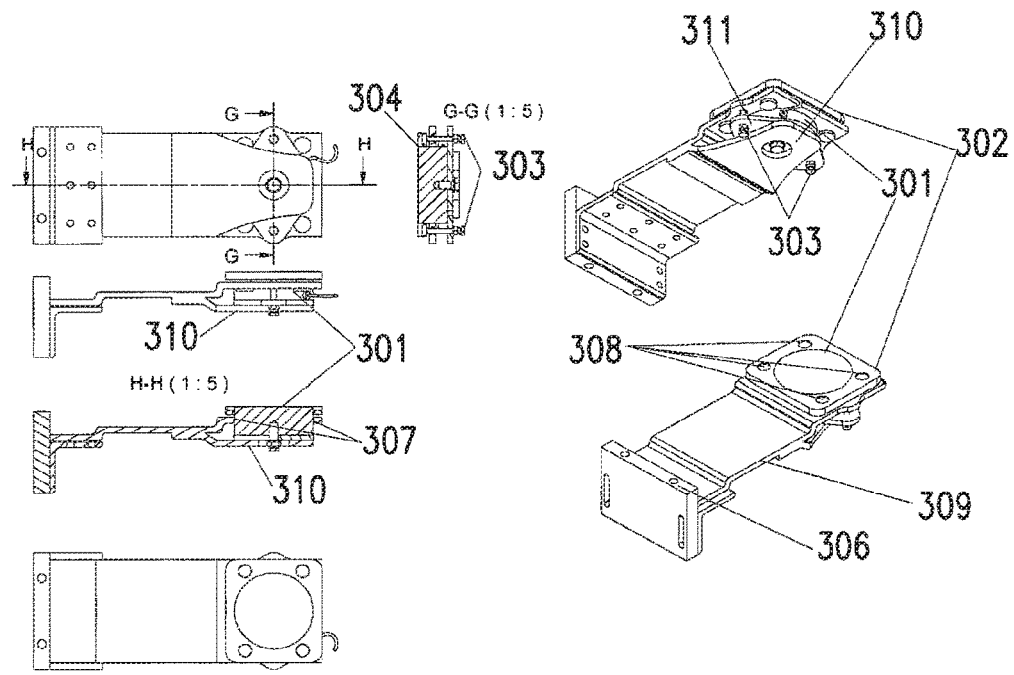

FIGS. 1 to 3 show a vibration absorber for a tower, in particular of a wind turbine, which is fitted, for example, with three electromagnetic brake devices (100, 200). These brake devices essentially consist of a retention device with a leaf spring, on one end of which a current-regulatable electromagnet is mounted. The mounting here is of the type that, with the current flowing, the electromagnet is pulled onto the metallic outside wall of the absorber mass (1) or a metallic contact surface (3), and at the same time tensions the leaf spring (105, 2015) attached thereto. The positioning of the electromagnet against the absorber mass or a contact surface which is connected to the absorber mass brakes the pendulum movement of the absorber mass if desired, until it stops. Variable current management (variation of the magnet strength by changing the current flow) calculated in advance enables specific influencing of the swinging of the pendulum and thus damping of the system to be damped by the absorber. When the current is switched off and the magnet action is interrupted, the brake device is returned to the starting position by the spring tension present.

In principle, it is possible to install and arrange a plurality of electromagnetic brakes of this type on one vibration absorber, as is shown The arrangement is preferably carried out here in such a way that all conceivable directions of movement of the pendulum device are made possible. In the case of the classical suspended pendulum with mass at the end of the pendulum, the electromagnetic brake devices can be arranged below the pendulum mass or above it, depending on the available space. These can be arranged, as shown in FIGS. 1 and 3, below the pendulum mass or, as depicted in FIG. 2, also above the pendulum mass. They can act directly on the absorber mass or also, as shown in FIG. 2, act on elements arranged outside the mass.

The braking and damping action can likewise be influenced by the number of brake devices (usually 1-3 or 4) and their distribution in the region of the absorber mass. In accordance with the invention, the absorber mass is steel or steel alloy. If the absorber mass does not consist of magnetisable material, corresponding steel or steel alloy contact surfaces or flanges, which may come into contact with the electromagnet, must be mounted on this material.

FIGS. 4 to 7 show diverse embodiments, designs and arrangements of the brake device according to the invention using, for example, reinforcing stays and brake linings, which are described further in detail as follows.

Variant 1: This variant represents the simplest design. The core piece, the electromagnet (101), is attached to a leaf spring. The leaf spring (105) is adjusted in its attachment construction (106) in such a way that the magnet reaches a maximum air gap (4) of, for example, 5 mm. The bending of the relatively long leaf spring enables the movement of about 5 mm with a small attractive force. Instead of the long leaf spring, the use of shorter springs which have a zigzag design, so that the bending length becomes correspondingly longer, is also [lacuna]. Since the leaf spring also has to absorb transverse forces, it is relatively wide. In general, leaf springs having a thickness of about 5 mm and a width of about 100-200 mm with a length of about 300-500 mm can be used in accordance with the invention.

Variant 2: In this variant, a relatively thin leaf spring with a thickness of 2 mm to 4 mm, preferably 3 mm, can be used. The force transmission takes place through the magnet holder (209). This is mounted on the attachment construction (206) and surrounds the magnet (201) with a sliding guide (207). As an alternative to the sliding guide described, the magnet can be guided via the brake plate (202) with the cams (208), which is mounted on the magnet in an interlocking manner. The cams (208) are attached to the magnet holder (209). The leaf spring therefore does not need to transmit any radial loads.

Variant 3: In this variant (FIG. 6), a leaf spring is omitted. The electromagnet works upwards and falls downwards onto the magnet support (310) due to gravitational force after release of the magnet (by switching off the current or reducing the current). The brake lining support plate (311) serves for adjustment and support of the brake plate (302).

Figure 7:
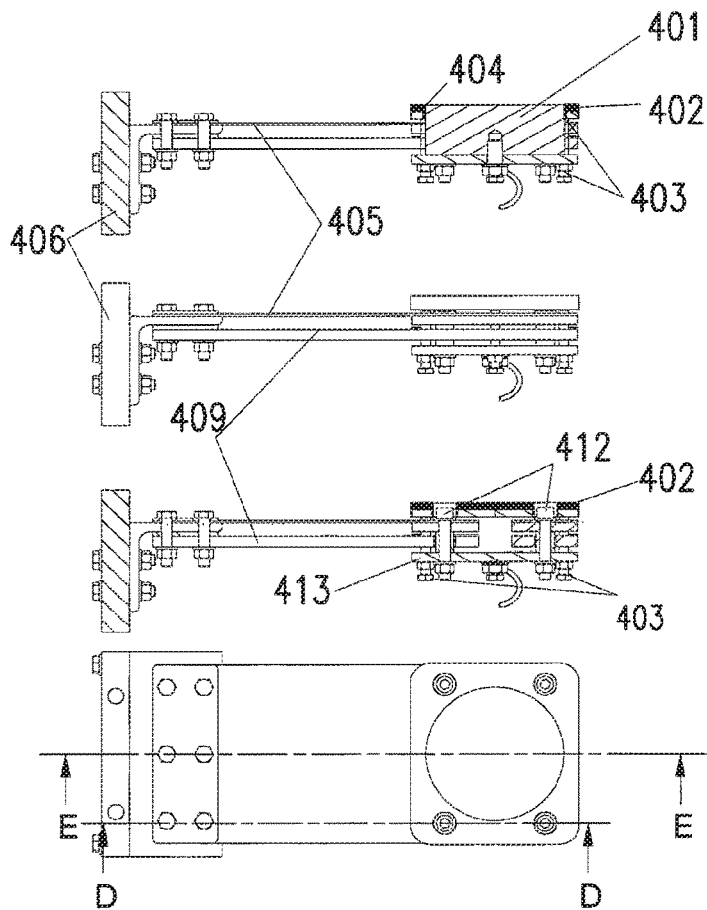

Variant 4: In a similar manner to variant 2, only a thin leaf spring, 405, which merely takes on the guiding of the magnet, is required here (FIG. 7)

Figure 8:
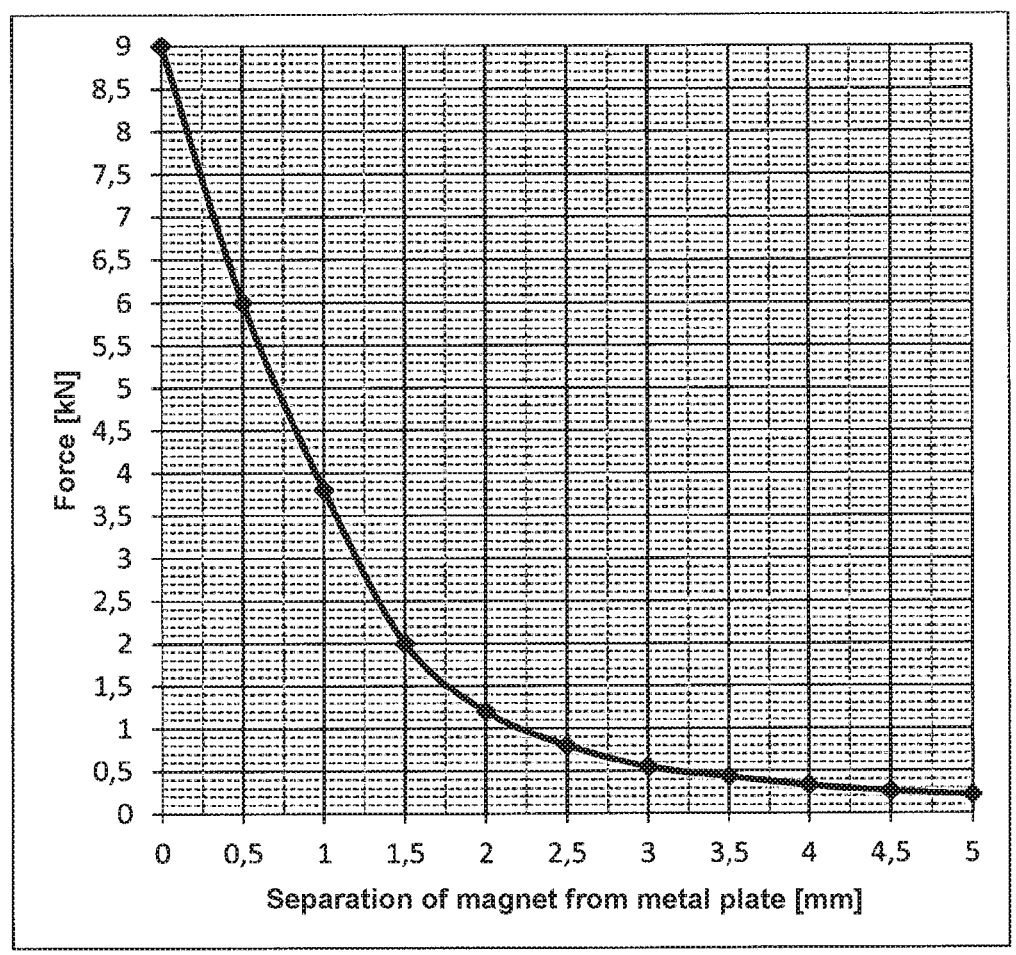
FIG. 8 shows a typical diagram between magnetic force and separation of the magnet from the metal plate (absorber mass)

FIG. 8 shows a typical diagram between magnetic force and separation of the magnet from the metal plate (absorber mass). In accordance with the invention, the electromagnet generally has a separation of about 3-10 mm, preferably about 5 mm, from the absorber, or from the corresponding moved absorber mass (1, 510) to be braked. This separation can be maintained from the swinging element with relatively small force, for example owing to soft leaf springs. It should be noted here that the magnetic force increases disproportionately with decreasing separation, as shown in FIG. 8. In the case of the example shown, the magnetic force in the case of a separation of the electromagnet of 5 mm is still greater than 200 Newtons. This is sufficient to move the electromagnet in the direction of the pendulum mass against the opposing spring force of the leaf spring. For particular areas of use, the attractive force can be increased, making greater separations and-or stiffer leaf springs possible. Since the magnet is attracted instantly, only a very short force pulse is required. To this end, it may be advantageous to provide a greater electrical voltage for a short time. This can be effected via a short voltage surge (for example capacitor discharge) during switching-on of the magnet. Since the higher voltage and thus also greater warming only takes place over a short period, the low thermal energy means that the magnet does not have to be designed for high voltages.

FIGS. 9-13 show a vibration absorber according to the invention which [lacuna] as rolling pendulum absorber which moves on a curved running track, and is fitted with a rotating flywheel mass, which moves along the curved running track together with the running device.

The vibration absorber in this case is formed by a running surface (50) which is curved upwards at the ends, with two parallel running rails. Running gear (508) with wheels or rollers is moved to and fro on this running device in accordance with the vibrations of the installation. The running gear with the rollers or wheels also includes the absorber mass (1) and a rotating flywheel (511, 711) with a flywheel mass (512, 701), which can optionally be varied. Flywheel and flywheel mass form the core components of the rotation mass component (514, 701). Absorber mass and flywheel mass move with the running gear. The construction is fitted with one or more electromagnetic brakes, as described, which are able to brake or damp the movements of the absorber main mass and/or the flywheel mass.

The running device of the absorber according to the invention has, as stated, at least in the central region, a curved shape, which substantially corresponds to the circular shape. The running device may also be substantially linear or have a hyperbolic shape, in particular in its two end sections. The running profile may also be circular with a different radius at the end than in the central region. The length of the running device that the running gear with the absorber main mass and the rotation mass can cover by rolling can be adapted to the space necessities in the installation. For wind turbines, it has been found that the most suitable length is 2 m to about 5 m, preferably between 3 to 4 m. The two other dimensions can be significantly smaller. The diameter of the rotation mass for an absorber of this size can be selected approximately between 0.25 m and 0.75 m, although diameters >0.75 m can also be employed. An absorber having such dimensions can in principle be installed not only inside or outside in the tower of a wind turbine, but also in the nacelle.

In general, it is possible in accordance with the invention for the running gear to be provided with a plurality of drive wheels and thus also a plurality of rotating flywheel masses, in particular two flywheel masses or rotation mass components. The size or diameter of the drive wheel rotating on the running rail or running tube determines with the speed of rotation of the wheel and thus also the speed of rotation of the flywheel connected thereto and of the rotation mass. A variable speed of rotation also enables the frequency setting of the absorber to be influenced. Thus, it is also possible to increase the speed of rotation of the flywheel by a multiple relative to the drive wheel by installation of a gearbox. It is furthermore also possible to drive the drive wheel and thus the flywheel of the rotation mass component or the flywheel itself actively by means of a motor.

In accordance with the invention, the rotation mass component (510) comprises a flywheel made of metal, plastic, carbon fibre or a composite material. It preferably consists of steel or aluminium and can in a lightweight design also be in the form of a variant provided with spokes. The flywheel has a central shaft or axle, which may be designed as a roller bearing, by means of which it is connected on one side to the running gear via a drive wheel. The rotation mass/flywheel mass (512, 701), which rotates in the same way as the flywheel (511, 711), are located on the other side. The rotation mass can be formed by one or more discs of smaller or larger diameter or by mass elements arranged along the periphery of the flywheel or of a smaller or larger radius arranged in a fixed manner or so as to be movable radially outwards or inwards. This enables the resonant frequency of the vibration system to be influenced.

The axle or shaft of the flywheel and thus of the rotation mass is directed in such a way that the plane of the wheel is arranged substantially parallel to the other running wheels on the rails or running tube, so that, in the optimum case, the direction of rotation of the rotation mass corresponds to the direction of the running device and thus to the direction of the running gear. By variation of the mass discs or mass disc segments, the frequency and thus the damping can be influenced.

Figure 9:
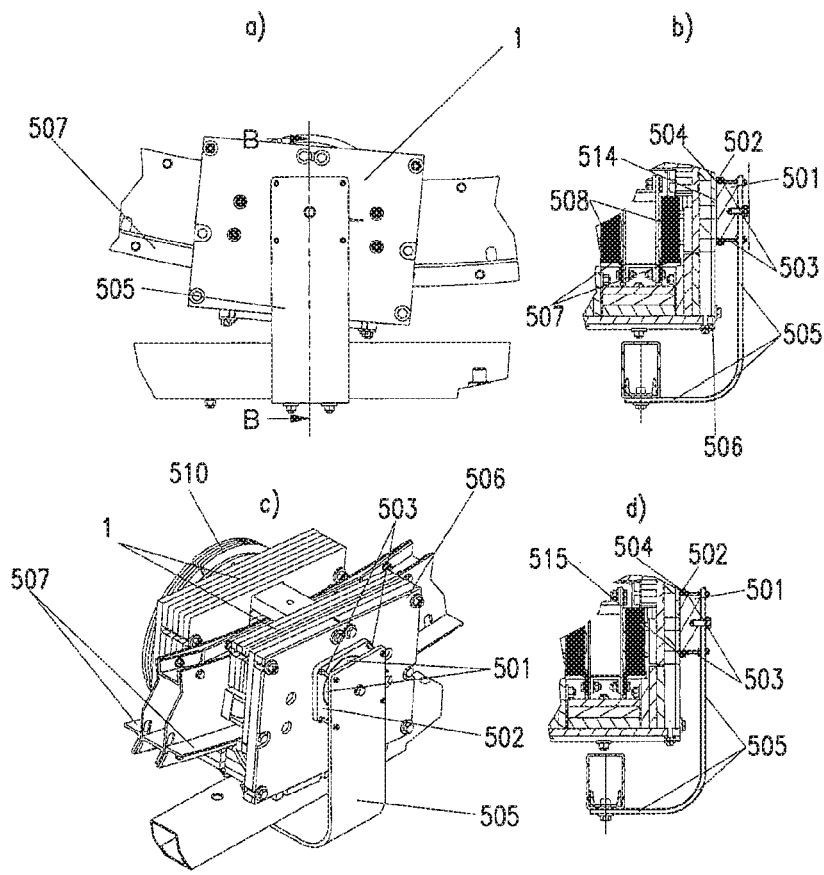
FIGS. 9A, 9B, 9C, 9D, 10A and 10B depict embodiments of a rolling pendulum absorber of the type with a corresponding brake device.
Figure 10:
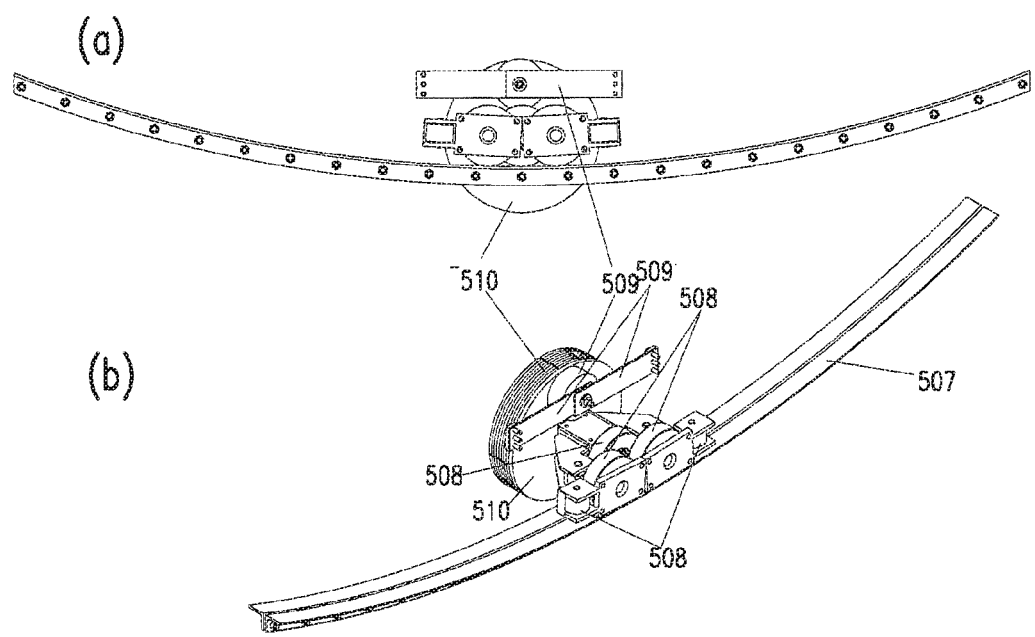

An embodiment of a rolling pendulum absorber of this type with corresponding brake device is depicted in FIGS. 9 and 10. This has a running device comprising two parallel running rails (here constructed as a double T rail), and running gear having two free-running running wheels, which are arranged one behind the other and run on the first running rail, and a drive wheel, which is arranged on the second running rail opposite the two free running wheels and is connected to an outward-facing flywheel (511, 711) having at least one mass disc (512). The rotation mass component (510 is mounted on the running gear, or is a part thereof.

Figure 11:
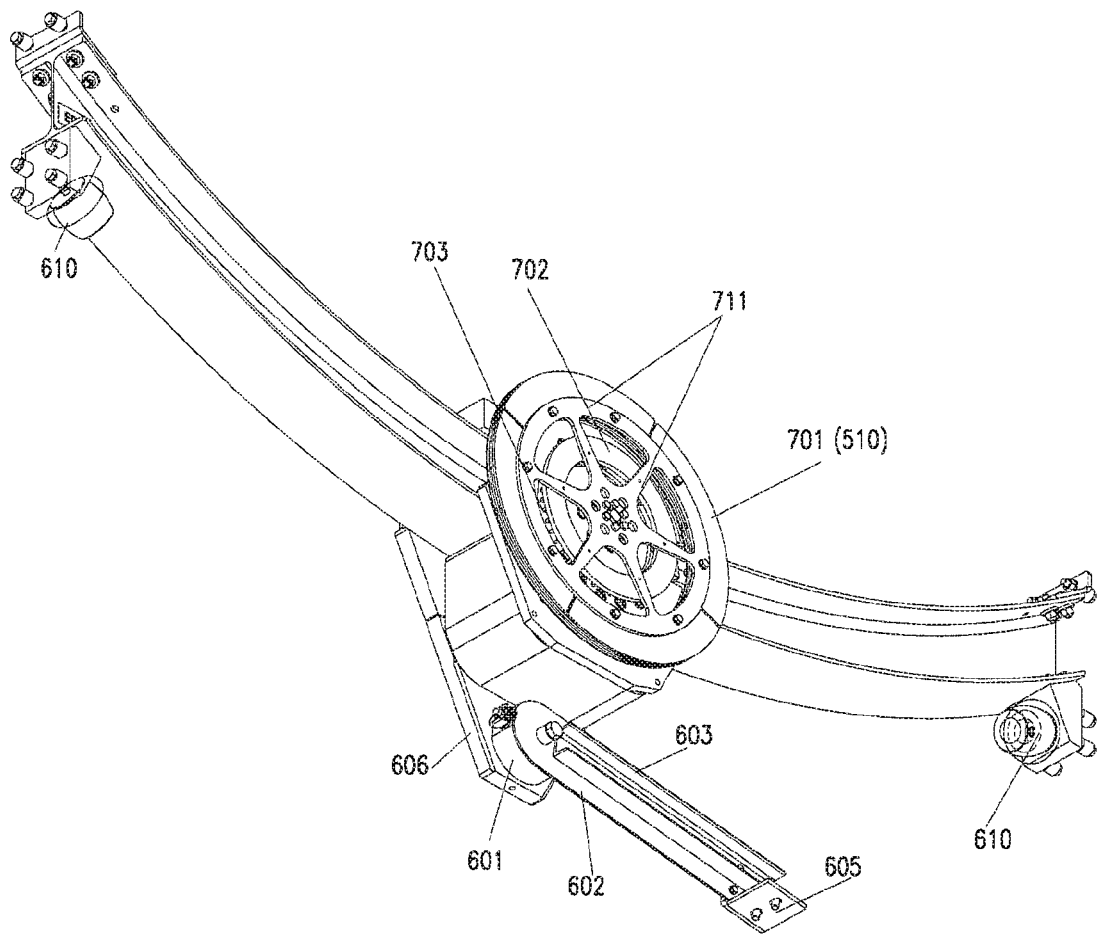
Figure 12:
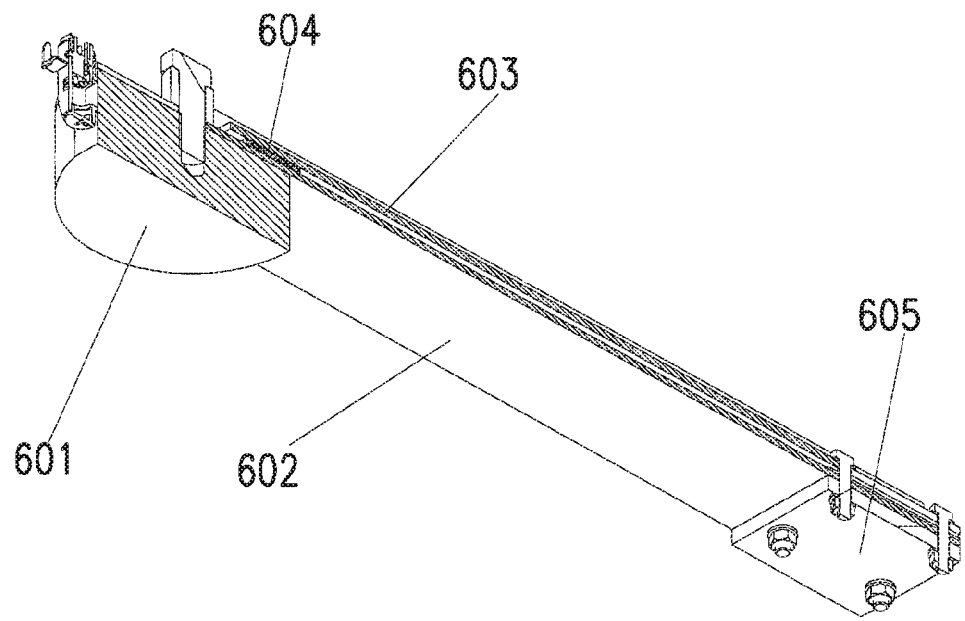

FIGS. 11-13 show further advantageous embodiments of a rolling pendulum absorber according to the invention having a brake device according to the invention, as described, very space-saving below the running gear and below the running rails. The rotation mass component (510, 701) here has an additional damping device in the form of an eddy current damper (702, 703), as described above. (FIG. 11, FIG. 13)

In order that the brake cannot start juddering in the unbraked state, and also the relatively sensitive leaf spring (602) with the brake fixing cannot be bent due to mistreatment, it can be supported by means of a stiffening strip (603). In order to prevent the leaf spring (602) from swinging upwards, a damping rubber element (604) is placed between leaf spring and stiffening strip (603). The leaf spring presses against the rubber element (604) with a slight pretension, so that the latter is slightly pretensioned in the unbraked state, which prevents the brake from swinging upwards (FIG. 12).

Furthermore, in the case of extreme load conditions, the danger exists that the absorber moves against the stop buffer (610) on the end of the running rail (507) with a relatively high speed.

Since the rotating flywheel mass (701) wants to rotate further in this case, large loads would act on the drive roller (713). In order to prevent this, an overload slip clutch (700) is provided. In this, clutch lining discs are pressed together with a compression spring pretensioning disc (710) by a compression spring (709). The compression spring (709) is pretensioned so much that the friction of the clutch lining discs transmit the torque which is necessary for normal operation. If larger loads occur, a relative movement takes place between the drive roller with teeth (713) and the drive shaft (701) for rotation flywheel mass (701), so that unacceptable loads can no longer become effective between the drive roller and the teeth (FIG. 13).

The invention claimed is:

1. A vibration absorber for damping vibrations in a wind turbine, which has at least one pendulum device, comprising:
    an absorber mass (1) which
        (i) is attached to a suspension construction (2) in such a way that the absorber mass (1) can swing freely, or
        (ii) is connected to a running device (507), which is curved in a substantially concave or circular manner at least in its central region and on which the absorber mass (1) can move to and fro together with a driven rotating, rotationally symmetrical rotation mass component (510) by a roller- or a wheel-driven running gear (508),
    wherein the vibration damper has an electromagnetic brake device (100, 200), which comprises an electromagnet (101, 201, 301, 401, 501, 601), which is attached to a springy retention or guide device (105, 106, 205, 206, 209, 306, 307, 308, 309, 505, 506, 602) on the vibration absorber in such a way that, when current flows in the electromagnet, the electromagnet is pulled onto the absorber mass (1) or onto the rotation mass component (510), which is connected to the absorber mass (1), until contact occurs, so that the movement of the absorber mass or rotation mass component is thereby braked or stopped, and the electromagnet returns to an initial position in a current-free state due to the springy retention or guide device or merely due to its weight, with release of the absorber mass or rotation mass component, where the electromagnetic brake is operated by controlled current management in such a way that the electromagnetic brake effects stopping or braking and restarting of the absorber mass (1, 510), or variable frequency-dependent damping of movement of the absorber mass and thus of the undesired vibration.

2. The vibration absorber according to claim 1, wherein the pendulum device is connected to a running device (507), which is substantially curved in a concave or circular manner, at least in its central region, and on which the absorber mass (1) moves to and fro together with the rotating rotation mass component (510) by a roller- or a wheel-driven running gear (508), where the rotation mass component has an axis of rotation perpendicular to the plane of the orbit of the running device, and the rotation device of the rotation mass component substantially corresponds to a respective direction of the moved running gear (508) along the running device (507).

3. The vibration absorber according to claim 2, wherein the running device (507) has at least one running rail, and the running gear (508) or the absorber mass (1) moves to and fro on the running device on at least two running wheels or running rollers or drive wheels or running rollers.

4. The vibration absorber according to claim 3, wherein at least one of the running rail and at least one running wheel of the running device (507) has a coating, impression or surface structure for the running surfaces which increases friction forces.

5. The vibration absorber according to claim 4, wherein the impression is a toothed belt or the surface structure is a tooth structure.

6. The vibration absorber according to claim 3, wherein at least one drive wheel or running wheel has a slip clutch.

7. The vibration absorber according to claim 2, wherein the rotation mass component (510) substantially comprises a driven flywheel (611, 711) with drive axle or shaft and one or more mass discs (512, 701) or disc segments thereof, which can be pushed onto the axle or shaft of the flywheel or attached thereto and rotate together with the flywheel.

8. The vibration absorber according to claim 7, wherein the flywheel (611, 711) has a device which enables a diameter of the mass discs or a mass disc segments of the rotation mass component to be changed, or a center of gravity of the rotating discs or disc segments to be changed radially, or in that mass discs of different diameter are employed.

9. The vibration absorber according to claim 7, wherein the flywheel has a parking brake (509).

10. The vibration absorber according to claim 2, wherein the rotation mass component (510) has an adjustable variable rotating mass (512, 701) which, depending on a diameter, corresponds to 1%-30% of the absorber mass (1).

11. The vibration absorber according to claim 1, wherein the vibration absorber has an additional device for damping vibrations.

12. The vibration absorber according to claim 11, wherein the additional device is an eddy current damper which is accommodated and effective in the rotation mass component (510).

13. The vibration absorber according to claim 12, wherein the eddy current damper comprises a magnet arrangement (703) which comprises permanent magnets and an electrically conducting, non-magnetisable metal disc (702).

14. The vibration absorber according to claim 13, wherein
    (a) the magnet arrangement (703) is arranged on a periphery of a flywheel (711, 611), and the metallic conductor disc (702) is permanently installed between magnet arrangement and the flywheel mass (512, 701), or
    (b) the flywheel (1711, 611) is provided with the co-rotating metallic conductor disc (702) or is itself the conductor disc, and the magnet arrangement (703) is arranged opposite on a non-co-rotating plate, which is located between the flywheel (711, 611) and the flywheel mass (512, 701).

15. The vibration absorber according to claim 1, wherein the electromagnet has a brake lining in a form of a brake plate, a brake layer or a brake ring structure (102, 202, 302), and this lining at least partially covers an area of the electromagnet facing the absorber mass (1, 510), and is intended to prevent the electromagnet from coming into direct contact with the metal surface of the absorber mass (1, 510) in the braked state.

16. The vibration absorber device according to claim 15, wherein the vibration absorber device has an adjustment device (103, 203, 303) for adjusting a thickness and readjusting separation of the brake lining from the absorber mass (1, 510).

17. The vibration absorber device according to claim 15, wherein the brake lining (102, 202, 302) is a brake ring which covers edge regions of the electromagnet and moves in a direction of the absorber mass (1, 510) or its contact areas (3) (606) by adjustment devices (103, 203, 303).

18. The vibration absorber according to claim 1, wherein the springy retention or guide device is a leaf spring (105, 205, 602) which has one end attached the electromagnet (101, 201, 301, 401, 501, 601).

19. The vibration absorber according to claim 18, wherein the leaf spring (105, 205, 602) has a stiffening element (603), and a damping rubber element (604) is placed between leaf spring and the stiffening element.

20. The vibration absorber according to claim 1, wherein the springy retention or guide device and the electromagnet attached thereto is arranged above and/or below the absorber mass (1) or the rotation mass component (510).

21. The vibration absorber according to claim 1, wherein the absorber mass (1) or the rotation mass component (510) has, either below, above or on an upper or a lower side surface thereof at points predetermined, at least one contact area (3) or a contact flange (606) for the electromagnet which is designed and arranged in such a way that the pendulum construction with the absorber mass can swing or move unhindered.

22. The wind turbine comprising:
a tower,
a nacelle, and
a rotor, wherein the wind turbine has a vibration absorber according to claim 1 which is mounted in the tower or in the nacelle or outside on the nacelle.

* * * * *